United States Patent [19]

Krause et al.

[11] 4,134,633

[45] Jan. 16, 1979

[54] ELECTRICAL BUSWAY APPARATUS

[75] Inventors: Werner A. Krause, Plantsville; Frank C. Johnston, Trumbull, both of Conn.

[73] Assignee: General Electric Company, New York, N.Y.

[21] Appl. No.: 861,227

[22] Filed: Dec. 16, 1977

[51] Int. Cl.² .......................................... H01R 13/60
[52] U.S. Cl. ................................................. 339/22 B
[58] Field of Search ........................... 339/21, 22, 18; 174/68 B, 72 B, 88 B, 99 B

[56] References Cited

U.S. PATENT DOCUMENTS

| | | | |
|---|---|---|---|
| 249,574 | 11/1881 | Blake | 339/18 P |
| 3,178,668 | 4/1965 | Weimer et al. | 339/22 B |
| 3,206,706 | 9/1965 | Cataldo et al. | 339/22 B |

OTHER PUBLICATIONS

IBM Bulletin, B. E. Hart et al., vol. 13, No. 7, p. 2106, 12-1970.

*Primary Examiner*—Neil Abrams
*Attorney, Agent, or Firm*—Robert A. Cahill; Walter C. Bernkopf; Philip L. Schlamp

[57] ABSTRACT

The sandwiched, fully insulated bus bars in a busway section are each provided with an insulation-free, through contact aperture in registry with enlarged, insulated, through clearance apertures formed in the overlying portions of the other bus bars. The stabs of a bus plug, individually electrically associated with different ones of the bus bars, extend through the clearance apertures in unassociated bus bars for electrical contacting engagement with the sidewalls of the appropriate contact apertures. The contact elements of the stabs are of sufficient length such that the stabs may be plugged into engagement with the appropriate contact apertures from either side of the busway.

2 Claims, 2 Drawing Figures

ELECTRICAL BUSWAY APPARATUS

BACKGROUND OF THE INVENTION

The present invention relates to electrical busway apparatus, and particularly to an improved, plug-in busway and compatible bus plug.

Modern electrical busway design typically calls for the bus bars to be individually insulated and arranged in side-by-side, sandwiched relation within a close-fitting housing. This affords an extremely compact design and also promotes a cool running busway since the housing can act as a large heat sink. At each end of the busway sections, the bus bars are typically spread apart or "fanned out" to provide laterally spaced terminal portions which facilitate the making of electrical joints between busway sections. Exemplary of this approach is the disclosure in commonly assigned U.S. Pat. No. 3,365,537. Our commonly assigned U.S. Pat. No. 3,882,265 discloses an alternative approach which does not require fanning of the bus bar terminal end portions at the ends of busway sections. Rather, the bus bar terminal end portions are provided with a longitudinally staggered array of individual scarf lap joint halves which are clamped in electrical connection with a complementary staggered array of individual scarf lap joint halves provided in the bus bar terminal end portions of an adjacent busway section, pursuant to joining two sections end-to-end.

Another situation typically calling for lateral separation of the sandwiched bus bars is where a power take-off device, such as a busway plug, is to be tapped into a busway section. This approach, as represented by the disclosure of commonly assigned U.S. Pat. No. 3,384,856, accommodates electrical engagement of the take-off device stabs with the individual bus bars while conveniently affording electrical isolation between phases. An alternative approach, disclosed in U.S. Pat. No. 3,744,002, maintains the sandwiched relationship of the bus bars while preserving phase isolation by appropriately notching the edges of the bus bars so that the plug stabs can reach in to electrically engage the edge portions of individual bus bars without contacting the other bus bars. U.S. Pat. No. 3,178,668 discloses still another approach, wherein bus plug stabs of varying lengths extend through clearance holes in some of the bus bars and into abutting electrical contacting engagement with the planar surfaces of appropriate individual bus bars.

It is an object of the present invention to provide improved electrical busway apparatus.

A further object is to provide an improved plug-in busway and bus plug therefor.

An additional object of the present invention is to provide plug-in busway wherein the bus bars remain in sandwiched relation, and yet are capable of accommodating a bus plug.

Yet another object of the present invention is to provide the combination of an improved plug-in busway and an improved bus plug, wherein proper phasing is maintained irrespective of from which side of the busway the plug is plugged in.

A still further object is to provide a plug-in busway and bus plug of the above character which are inexpensive to manufacture, convenient to implement and capable of providing a compact electrical joint.

Other objects of the invention will in part be obvious and in part appear hereinafter.

SUMMARY OF THE INVENTION

The electrical busway apparatus of the present invention includes novel plug-in busway and a novel bus plug compatible therewith the busway comprises a sandwiched array of individually insulated bus bars contained within a close-fitting housing. A contact aperture whose sidewalls are free of insulation is formed in each bus bar, while enlarged clearance apertures having insulated sidewalls are formed in each of the other bus bars at locations in registry with each contact aperture. The housing, in turn, is provided with an opening exposing the array of registered contact and clearance apertures.

The bus plug includes a plurality of stabs, each electrically associated, in terms of phasing, with a different one of the bus bars. The bus plug is mounted in registry with the housing opening and the stabs penetrate the clearance openings in unassociated bus bars in achieving electrical contacting engagement with the insulation-free sidewalls of the contact apertures in their associated bus bars.

In accordance with an important feature of the present invention, the bus plug stabs are equipped with contact elements of uniform lengths substantially corresponding to the thickness of the bus bar sandwich. Consequently, each plug stab is capable of achieving electrical engagement in the contact aperture in its associated bus bar irrespective of its position in the bus bar sandwich. Of particular significance is the fact that, by virtue of this construction, the bus plug may be mounted to either side of the busway without jeopardizing the capability of the plug stab to electrically engage their associated bus bars. That is, requisite phasing can be maintained irrespective of the direction from which the plug stabs penetrate the clearance and contact apertures in the bus bars.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which:

FIG. 1 is a transverse sectional view of a plug-in busway section and an engaged bus plug, both constructed in accordance with the present invention; and FIG. 2 is a partial schematic diagram illustrating the manner in which the busway section and bus plug of FIG. 1 are electrically mated.

Like reference numerals refer to corresponding parts throughout the several views of the drawing.

DETAILED DESCRIPTION

Figure 1:
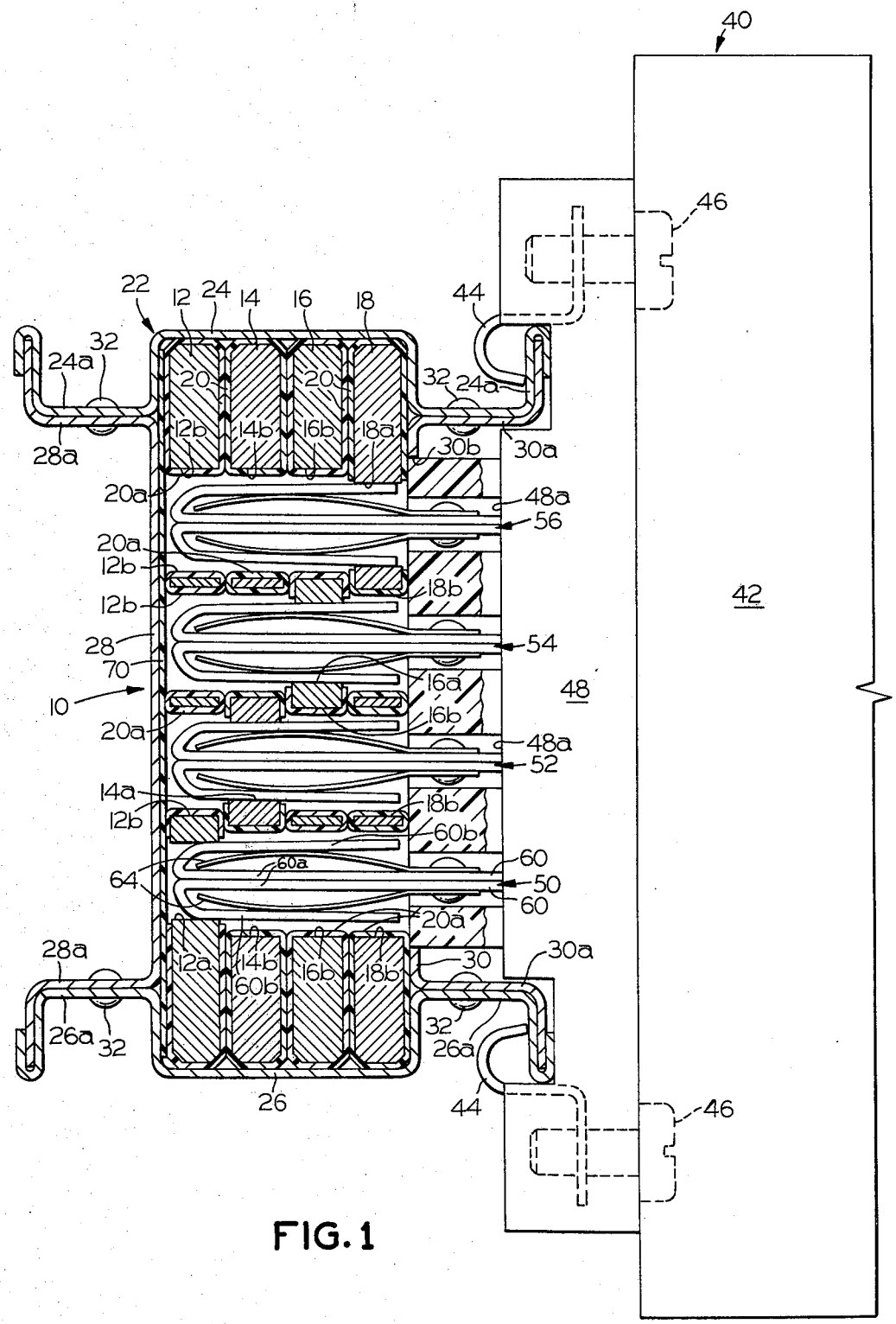

Referring to FIG. 1, the plug-in busway of the present invention, generally indicated at 10, includes a plurality of elongated, flat bus bars 12, 14, 16 and 18 of rectangular cross-section. The bus bars are completely coated over their exterior surfaces with an insulative film 20 so as to provide inter-phase electrical isolation while disposed in side-by-side, sandwiched relation within an elongated, close-fitting busway housing, generally indicated at 22. The busway housing includes top and bottom plates 24 and 26 having laterally offset marginal flange portions 24a and 26a which are joined with coextensive marginal flange portions 28a and 30a of sideplates 28 and 30 by suitable means, such as rivets 32.

Figure 2:
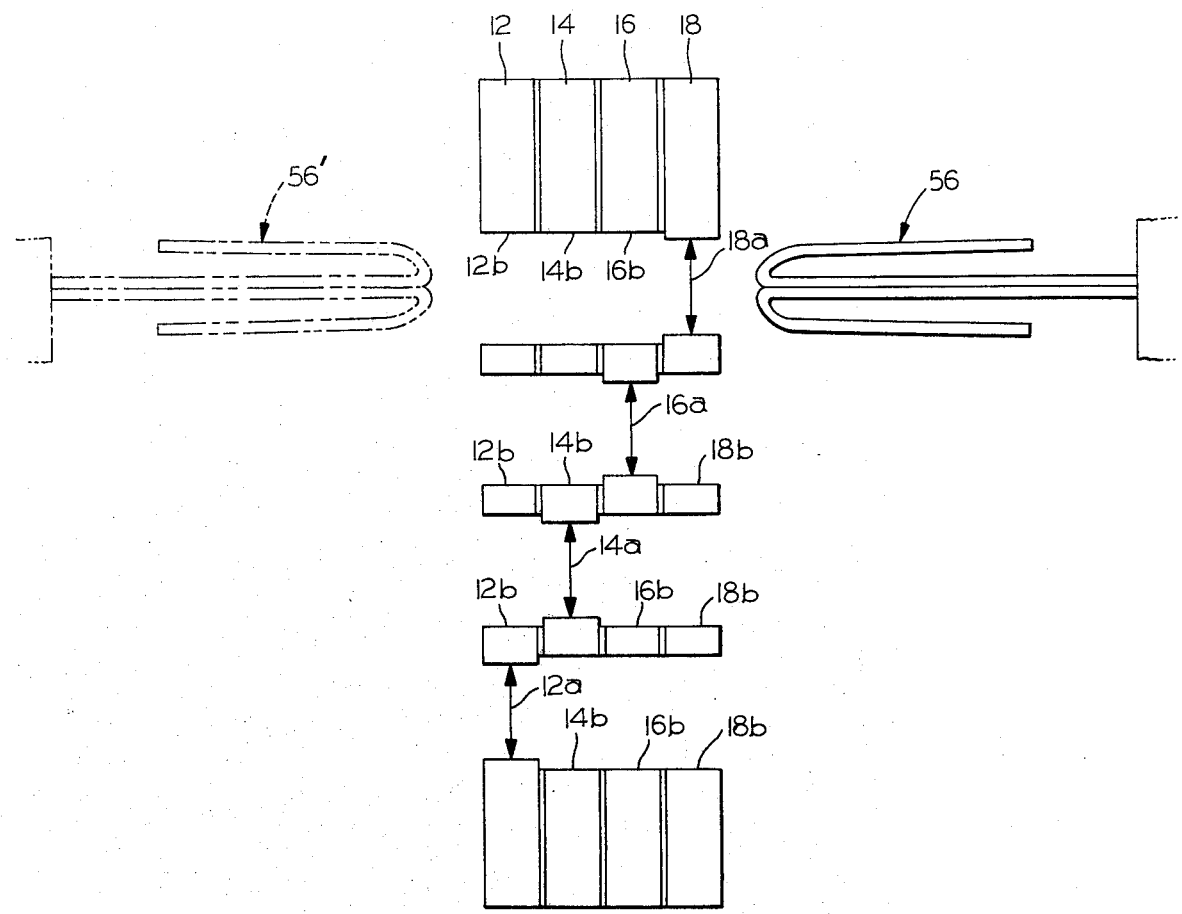

The bus bars, as seen in FIGS. 1 and 2, are each provided with separate contact apertures which, in the illustrated embodiment of the invention, are in a vertically spaced array. Thus progressing upwardly in this array, bus bar 12 is provided with a contact aperture 12a, while contact apertures 14a, 16a and 18a are provided in busbars 14, 16 and 18, respectively. In registry with contact aperture 12a in bus bar 12 are enlarged, clearance apertures 14b, 16b and 18b respectively formed in bus bars 14, 16 and 18. Similarly, additional clearance apertures 12b, 16b and 18b in bus bars 12, 16 and 18, respectively, are registered with the single contact aperture 14a in bus bar 14. Contact aperture 16a in bus bar 16 is registered with additional clearance apertures 12b, 14b and 18b in bus bars 12, 14 and 18. Finally, additional clearance apertures 12b, 14b and 16b in bus bars 12, 14 and 16 are registered with the single contact aperture 18a in bus bar 18. The sidewalls of all of the clearance apertures, like the bus bar exterior surfaces, are coated with an insulative film, as indicated at 20a. The contact aperture sidewalls are however devoid of insulation. The contact and clearance apertures may be circular or rectangular, as desired.

To tap current from plug-in busway 10, a bus plug, constructed in accordance with the present invention and generally indicated at 40, is utilized. This bus plug includes an enclosure 42 which may house an appropriate electrical device, such as a switch or circuit breaker, not shown. Brackets 44 secured to bus plug enclosure 42 by screws 46 are configured to engage the vertically turned terminations of the busway housing marginal flange portions 24a, 26a, 30a pursuant to mounting the bus plug to the busway housing 22 in confronting relation with an opening 30b in housing sideplate 30 exposing the vertical array of registered contact and clearance apertures in the bus bars. Protruding from one side of the bus plug enclosure with its outer end portion closely received in sideplate opening 30b is a molded, insulative stab base 48. Passageways 48a formed in this stab base accommodate the extension therethrough of stabs generally indicated at 50, 52, 54 and 56, which are arranged in a corresponding vertical array to individually penetrate the vertically arrayed, registered contact and clearance apertures in the bus bars. While not shown, it will be understood that the inner ends of the stabs would be electrically connected to the device within plug enclosure 42.

Each stab, as seen in the case of stab 50 in FIG. 1, includes a pair of like-configured conductive strips 60 each having a body portion 60a and resilient, bent-back contact portion 60b providing a generally U-shaped configuration. The body portions of the two strips 60 are secured in face-to-face relation by a rivet 62. Outwardly bowed, spring strips 64, secured in place by rivets 62, act to bias the contact portion 60b of each conductive strip 60 away from its body portion 60a.

From FIG. 1, it is seen that with bus plug 40 mounted in place, its stab 50 penetrates the clearance apertures 18b, 16b and 14b respectively in bus bars 18, 16 and 14 to achieve electrical contacting engagement of its contact portions 60b with the insulation-free sidewalls of contact aperture 12a in bus bar 12. Similarly, bus plug stab 52 penetrates the clearance apertures 18b, 16b and 12b in bus bars 18, 16 and 12 pursuant to achieving electrical contacting engagement with the insulation-free sidewalls of contact aperture 14a in bus bar 14. Stab 54 penetrates clearance apertures 18b, 14b and 12b to electrically engage the sidewalls of contact aperture 16a in bus bar 16, while stab 56 electrically engages bus bar 18 via its contact aperture 18a with its forward end portion clearing bus bars 16, 14 and 12 via the clearance apertures 16b, 14b and 12b therein. An insulative sheet 70 is situated between bus bar 12 and busway housing sideplate 28 to provide isolation between the bus plug stabs and sideplate 28.

From the foregoing description, it is seen that the present invention provides a novel plug-in busway and bus plug construction wherein the sandwiched bus bars of a busway section do not have to be laterally "fanned out" in order to accommodate tapping in of the bus plug. Thus an extremely compact bus plug-busway joint is achieved. Also to be noted is the fact that the bus plug stabs are identically constructed, thus affording fabrication and assembly efficiencies. This also provides the coincidental benefit of permitting the bus plug to be plugged into the busway from either side, as illustrated schematically in FIG. 2, without jeopardizing proper phasing. Assuming that bus bar 12 is the phase A bus, bus bar 14 is the phase B bus, bus bar 16 the phase C bus, and bus bar 18 the neutral bus, it is seen that regardless of which side the bus plug is plugged into the busway, the neutral bus plug stab 56 or 56' will still make electrical contact with neutral bus bar 18, phase C plug stab 54 will engage phase C bus bar 16, etc. This is made possible by virtue of the uniform elongation of contact portions 60b of the stabs to approximately equal the combined widths of the bus bars, i.e., the width of the busway section. Under these circumstances, the contact portions of each plug stab can reach across the busway section width to electrically engage the correspondingly phased bus bar, regardless of its position in the bus bar sandwich relative to the side from which the stabs are plugged in.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. Electrical busway apparatus comprising, in combination:

A. a busway section including
  (1) an elongated housing of rectangular cross-section,
  (2) a plurality of elongated, flat bus bars,
  (3) an insulative coating applied to the exterior surfaces of said bus bars to permit their disposition in sandwiched relation within said housing,
  (4) means forming a separate contact aperture in each said bus bar, the sidewalls of said contact apertures being free of insulation,
  (5) means forming plural, enlarged clearance apertures in the portions of said bus bars in registry with each said contact aperture, said insulative coating being applied to the sidewalls of said clearance apertures, and
  (6) means forming an opening in said housing to expose corresponding one ends of said registered contact and clearance apertures; and B. a bus plug mounted in registry with said housing opening, said bus plug including a plurality of stabs, each electrically associated with a different one of said bus bars, said stabs extending through said housing opening and said clearance apertures in unassociated bus bars for electrical contacting engagement with the sidewalls of said contact apertures in their associated bus bars, said bus plug stabs each include identical contact aperture sidewall engaging contact elements of lengths substantially corresponding to the combined thicknesses of said bus bars, whereby said stabs are capable of achieving electrical contacting engagement with said contact aperture sidewalls of their associated bus bars irrespective of which corresponding ends of said registered contact and clearance apertures are exposed by said housing opening.

2. The busway apparatus defined in claim 1, wherein said busway section further includes an insulative sheet situated between said housing and the ends of said registered contact and clearance apertures remote from said housing opening.